F. A. SMITH.
TOY.
APPLICATION FILED DEC. 13, 1919.

1,372,569.

Patented Mar. 22, 1921.
2 SHEETS—SHEET 1.

WITNESS:

INVENTOR.
Frank A. Smith
BY
Victor J. Evans ATTORNEY.

F. A. SMITH.
TOY.
APPLICATION FILED DEC. 13, 1919.
1,372,569.
Patented Mar. 22, 1921.
2 SHEETS—SHEET 2.
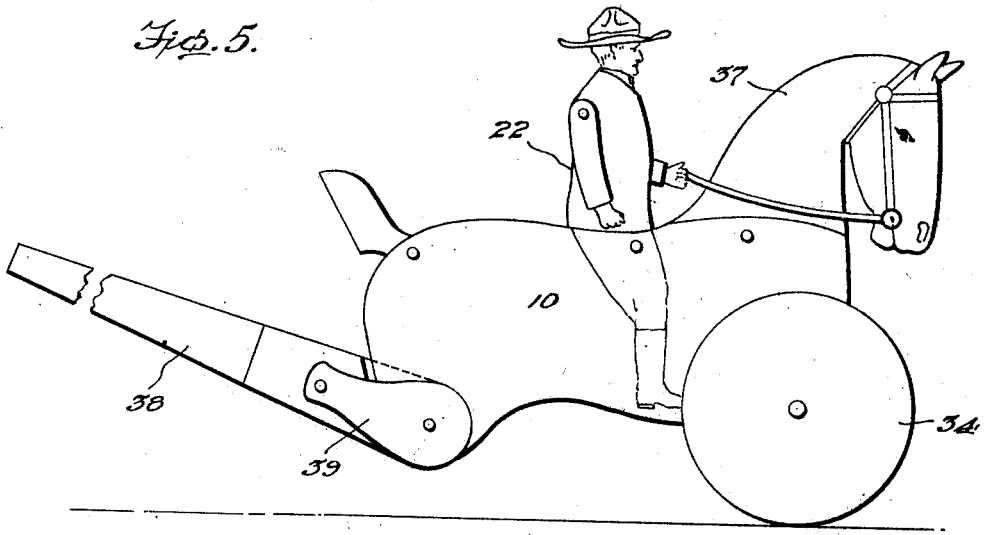
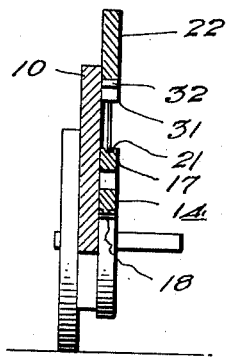
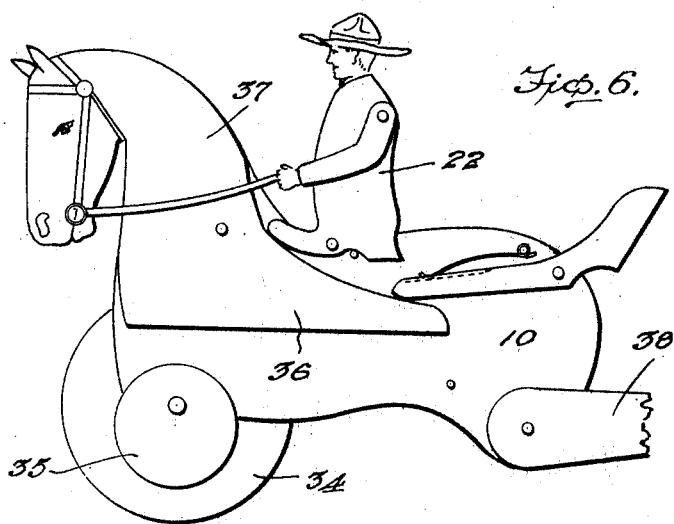
WITNESS:
INVENTOR.
Frank A. Smith
BY
Victor J. Evans ATTORNEY.

UNITED STATES PATENT OFFICE.

FRANK A. SMITH, OF NORTH STRATFORD, NEW HAMPSHIRE.

TOY.

1,372,569.

Specification of Letters Patent. Patented Mar. 22, 1921.

Application filed December 13, 1919. Serial No. 344,589.

*To all whom it may concern:*

Be it known that I, FRANK A. SMITH, a citizen of the United States, residing at North Stratford, in the county of Coos and State of New Hampshire, have invented new and useful Improvements in Toys, of which the following is a specification.

This invention relates to toys and has particular application to wheeled toys adapted to be pushed or pulled over the ground or surface.

The invention contemplates a toy designed to represent an animal having a rider, the head and tail of the animal being pivotally mounted upon the body and actuated from the ground engaging wheel for up and down movement, the rider being also mounted upon the body of the animal for rocking movement, so that when the toy is being used, it affords a splendid resemblance of a rough rider.

The nature and advantages of the invention will be better understood when the following detail rescription is taken in connection with the accompanying drawing, the invention residing in the construction, combination and arrangement of parts as claimed.

In the drawings forming part of this specification like numerals of reference indicate similar parts in the several views and wherein:

Fig. 4 is a sectional view taken on the line 4—4 of Fig. 2.

Fig. 5 is a view similar to Fig. 1 showing a modified form of the invention.

Fig. 6 is a view looking from the opposite side of the modified form of the invention.

Figure 2:
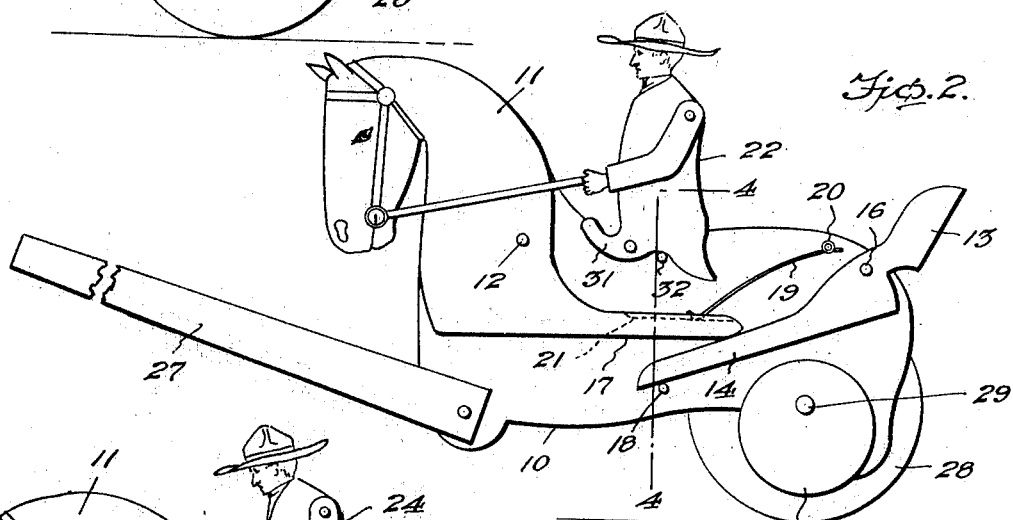
Fig. 2 is a similar view looking from the opposite side of the toy and showing the head and tail of the animal in normal position.

Referring to the drawings, in detail, 10 indicates a flat elongated member designed to represent the body of an animal such as a horse or the like, the head being indicated at 11 and pivoted upon one side of the body as at 12, while the tail 13 forms a part of the lever 14 which is pivoted upon the same side of the body 10 as a head, the pivot for the lever being indicated at 16. The head 11 is formed with an extension 17 which overlaps the adjacent extremity of the lever 14, these parts being normally held in the position illustrated in Fig. 2 by means of a stop pin 18 projecting from the body 10 of the toy. A leaf spring 19 has one end fixed to the body as at 20, while the opposite end of this spring is free to move in the groove 21 formed in the extension 17 of the head. The spring exerts a pressure upon the extension 17 to normally hold the parts in a position shown in Fig. 2, which as above stated bears against the stop pin 18. A toy figure indicative of a rider and shown at 22 is pivoted as at 23 upon the body 10, the arms 24 of such figure being also pivoted and connected to the head 11 of the animal through the instrumentality of the reins 25. The rider is mounted for rocking movement, and as the figure is rocked in the manner to be hereinafter described, the arms 24 are slightly moved independently of the figure 22 as will be readily understood. 26 indicates one of the forelegs of the animal to which is secured the handle 27, utilized for pulling the toy over the ground or surface. A ground engaging wheel is indicated at 28 and is secured to the axle 29 which is journaled in the body 10. The wheel 28 is arranged upon the side of the body 10, opposite the side upon which the head and tail is pivotally mounted. The axle 29 projects an appreciable distance beyond the side of the body 10 upon which the head and tail is pivoted and carries an eccentric 30, which upon rotation actuates the various movable parts in a manner to be presently described.

Figure 3:
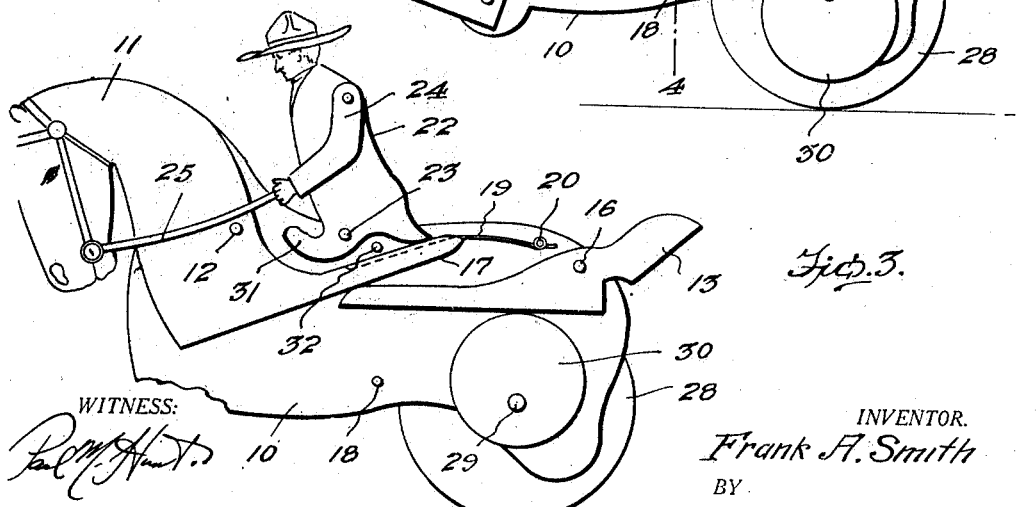
Fig. 3 is a view similar to Fig. 2, showing the active position of the eccentric and the adjusted position of the rider, and the head and tail of the animal.

In practice, the toy is pulled over the ground or surface, thus rotating both the wheel 28 and the eccentric 30. When the eccentric 30 is brought into active engagement with the lever 14, the latter is elevated upon its pivot 16 thus lowering the tail 13. As above stated, the extension 17 of the head 11 overlaps the adjacent end of the lever 14, and consequently as the lever 14 is elevated, a similar movement is imparted to the combined head and lever 11 and 17 respectively. During this movement, the head 11 is lowered, exerting a pull upon the rein 25 causing the rider 22 to rock forwardly. These positions of the respective parts are illustrated in Fig. 3. In this position it will be noted that the rider 22 is formed with an extension 31 which coöperates with the lever 17 to limit the forward rocking movement of the rider. During the continued rotation of the wheel 28, and the eccentric 30, the latter of course is moved out of engagement with the lever 14 whereupon the spring 19 which is placed under tension when the parts are arranged in the position illustrated in Fig. 3, functions to automatically return the parts to normal position. Projecting from the body 10 is a stop pin 32 to limit the movement of the extension 17 and the rocking figure 22. It is of course understood, that when the toy is in use the various parts move in unison affording a good representation of a rough rider. It is manifest, that I have devised a toy which is simple in construction, the parts being arranged to minimize possible derangement, while the toy will afford considerable amusement especially to young children.

Figure 1:
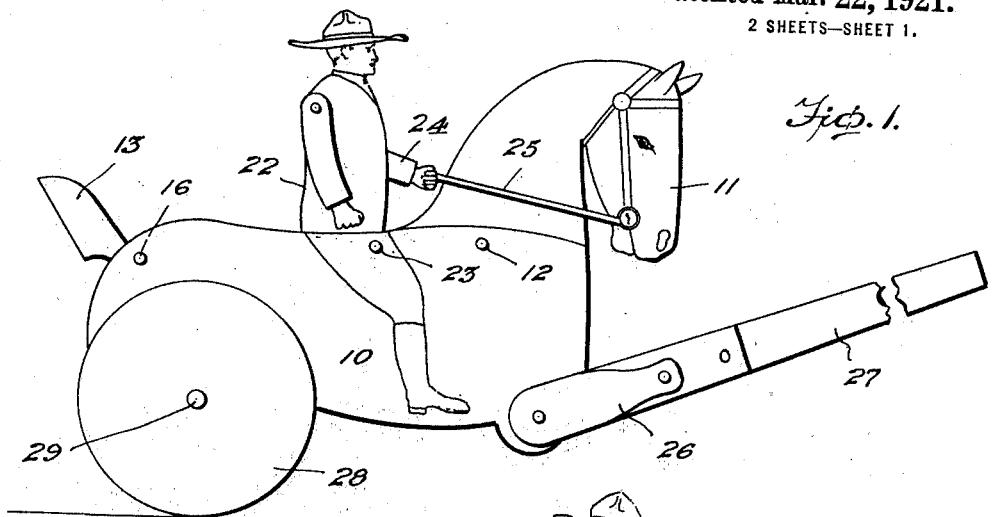
Figure 1 is a side elevation of the toy constructed in accordance with the preferred embodiment of the invention.

In Fig. 5, I have disclosed a modified form of the invention, wherein the ground engaging wheel 34 is disposed immediately beneath the head of the animal, in counterdistinction to the arrangement disclosed in Fig. 1. In this form of the invention, the eccentric 35 coöperates with the extension 36 forming part of the head 37, the toy in this instance being pushed over the ground or surface instead of being pulled as described in connection with the preferred form. For this purpose, the handle 38 is connected to one of the hind legs 39 as shown. In other respects, the toy as shown in this form of the invention, is exactly the same as that described in connection with the preferred form, the principles of operation being identical and for the same purpose. For instance, when the toy is pulled over the ground the eccentric 35 coming in contact with the head 37 throws the latter upon its pivot rearwardly in the direction of the rider and simultaneously with this movement of the head the toy figure 22 indicative of the rider moves forwardly upon its pivot. When the head is moved rearwardly the spring shown in Fig. 6 functions to depress the forward extremity of the tail.

While it is believed that from the foregoing description, the nature and advantages of the invention, will be readily apparent, I desire to have it understood that I do not limit myself in the construction shown, and that such changes may be resorted to when desired as fall within the scope of what is claimed.

What is claimed is:

1. A wheeled toy comprising an animal figured body including a head and tail pivotally mounted upon the body for simultaneous movement, a wheel journaled directly on one end of the body, a handle arranged at the opposite end, means mounted upon the axis of the wheel and operable to move said head and tail in one direction, a figure indicative of a rider pivotally mounted upon the body of the animal, and a connection between said figure and head of the animal for rocking the former.

2. A wheeled toy comprising an animal figured body including a head and tail member pivotally mounted upon the body for simultaneous movement, a wheel journaled directly upon one end of the body, means for moving the toy over the ground, an eccentric mounted upon the axle of the wheel and operable to engage one of the movable members, said members being disposed relatively whereby movement of one is imparted to the other so that both of said members are simultaneously movable.

3. A wheeled toy comprising an animal figured body, including a head and tail pivotally mounted upon the body for simultaneous movement, a wheel arranged at one end of the body, a handle at the opposite end thereof, an eccentric mounted upon the axis of the wheel and operable to move the head and tail in one direction, and a figure indicative of a rider, pivotally mounted upon the body for movement simultaneously with the movement of the head and tail.

4. A wheeled toy comprising an animal figured body including a head and tail member pivotally mounted upon the body for simultaneous movement, yieldable means for normally holding the head and tail in one position, a wheel arranged at one end of the body, a handle at the opposite end thereof, an eccentric carried by the axles of the wheel and arranged to engage one of the movable members upon rotation of the wheel and said members being disposed relatively whereby movement of one member is imparted to the other as described.

5. A wheeled toy comprising an animal figured body, including a head and tail pivotally mounted upon the body for simultaneous movement, a wheel arranged at one end of the body, a handle at the opposite end thereof, yieldable means for normally holding the head and tail in one position, an eccentric carried by the axis of the wheel and operable to move the wheel in a direction against the tension of said resilient means, a figure indicative of a rider pivotally mounted upon the body and connected with the head of the animal, and said figure being adapted to be rocked simultaneously with the movements of the said head and tail.

In testimony whereof I affix my signature.

FRANK A. SMITH.